United States Patent [19]

Gadelle et al.

[11] 4,370,078

[45] Jan. 25, 1983

[54] PROCESS FOR CONSOLIDATING GEOLOGICAL FORMATIONS

[75] Inventors: Claude Gadelle, Rueil Malmaison; Jacques Burger, Bougival; Charles Bardon, Rueil Malmaison, all of France

[73] Assignee: Institut Francais du Petrole, Rueil Malmaison, France

[21] Appl. No.: 229,221

[22] Filed: Jan. 28, 1981

[30] Foreign Application Priority Data

Jan. 28, 1980 [FR] France .................................. 80 01825

[51] Int. Cl.³ ................................................ E02D 3/12
[52] U.S. Cl. ..................................... 405/264; 166/288; 166/291; 166/294
[58] Field of Search ............... 166/260, 288, 291, 294, 166/295; 405/264

[56] References Cited

U.S. PATENT DOCUMENTS

| | | | |
|---|---|---|---|
| 3,007,520 | 11/1961 | Frey | 166/260 |
| 3,147,805 | 9/1964 | Goodwin et al. | 166/288 |
| 3,269,461 | 8/1966 | Strange et al. | 166/295 X |
| 3,941,191 | 3/1976 | Pusch | 166/288 |
| 3,974,877 | 8/1976 | Redford | 166/288 X |
| 4,168,593 | 9/1979 | Jankowiak | 405/264 X |

FOREIGN PATENT DOCUMENTS 1072460  6/1967  United Kingdom ............... 405/264

*Primary Examiner*—Stephen J. Novosad
*Assistant Examiner*—George A. Suchfield
*Attorney, Agent, or Firm*—Millen & White

[57] ABSTRACT

This process comprises injecting into the formations a liquid organic mixture containing at least one polymerizable chemical compound and a catalyst. The organic mixture reacts with a limited amount of injected oxidizing gas to produce a solid compound which consolidates the formations without substantially reducing their permeability. The process is characterized by the combined use of a polyethylenic hydrocarbon and of a catalyst which comprises at least one element of the group consisting of zirconium, cerium, lanthanum and lanthanides and at least one element selected from the group formed by vanadium, manganese, cobalt and zinc.

9 Claims, 1 Drawing Figure

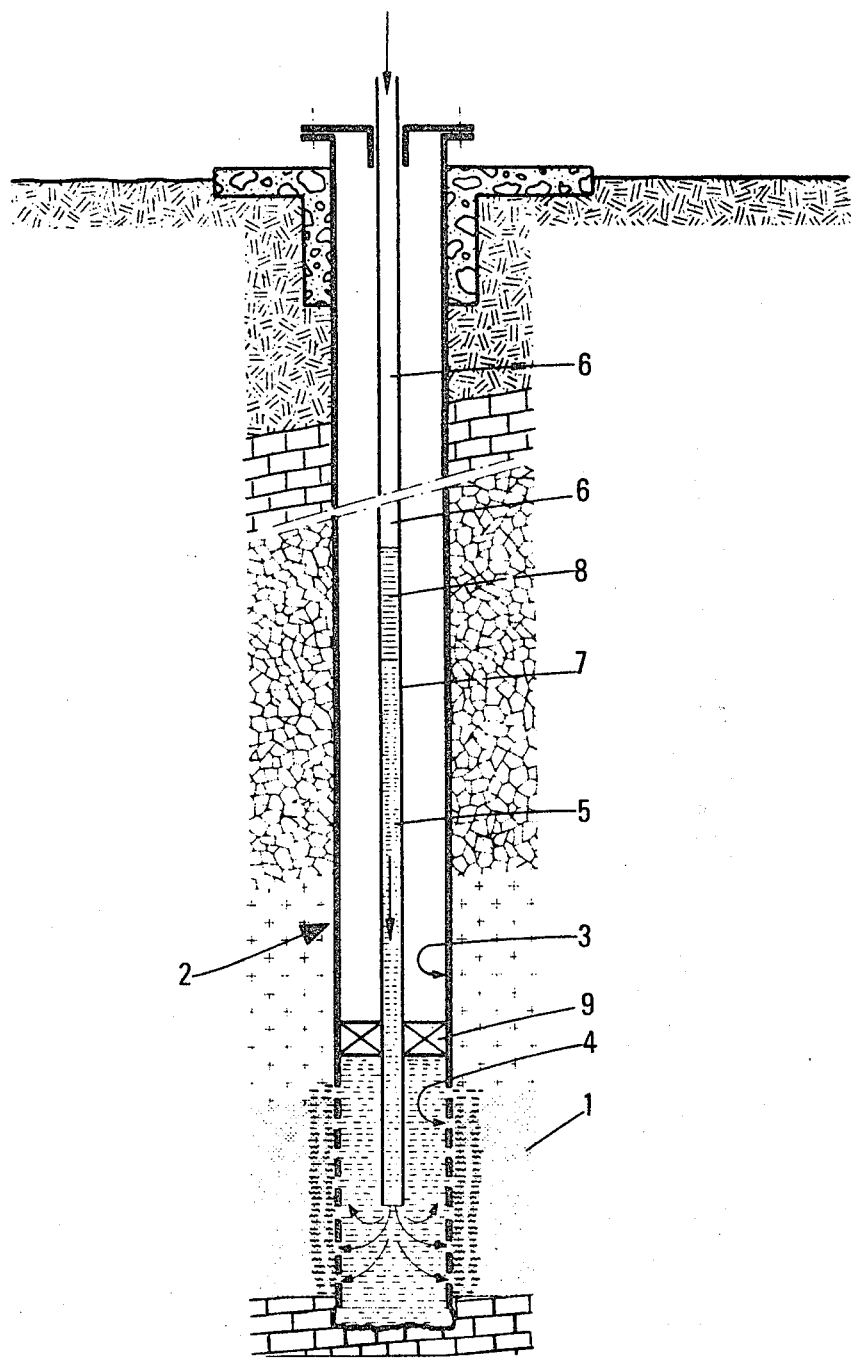

PROCESS FOR CONSOLIDATING GEOLOGICAL FORMATIONS

BACKGROUND OF THE INVENTION

The present invention relates to an improved process for consolidating geological formations, this process being in particular applicable to oil and gas reservoirs, to prevent sand from flowing into a well traversing unconsolidated, or insufficiently consolidated sand formations.

More generally this process can be used to locally consolidate permeable formations. Various methods have already been proposed to prevent sand from flowing into new boreholes, or to treat wells liable to be subjected to sand flowing during exploitation of oil or gas deposits.

A first type of method consists in maintaining the sand by mechanical means, using artificial screens with calibrated apertures, or packs of gravels having a well-defined size distribution, depending on the size of the sand particles or grains of the geological formation traversed by the borehole. Such a method is very often applied to new wells, but is difficult to put into operation.

A second type of method consists in injecting into the geological formation a liquid resin which, by polymerization, creates a bond between the sand grains. The efficiency of a chemical method of this second type is uncertain, since the reacton of polymerization of the injected resin depends essentially on the conditions prevailing in the borehole at the level of the formation and on the characteristics of the latter. Thus such a method does not permit control of the extent of the chemical reaction.

There is thus the risk either of an insufficient consolidation of the formation if the degree of polymerization of the resin is not sufficient, or of an excessive reduction of the permeability of the geological formation, or even of complete plugging thereof, if a too large amount of polymer is retained in some of the pores of the formation.

U.S. Pat. No. 3,388,743 discloses a consolidation method wherein injection of a drying oil into formations surrounding a borehole is followed by the injection of an oxidizing gas.

The partially oxidized oil constitutes a good binding material for the sand particles. By using an oxidizing catalyst, such as lead or cobalt naphthenate it is possible to shorten the time required for oxidizing the oil.

However the consolidation obtained by application of this method is generally insufficient for the intended purpose.

French Pat. No. 1,409,599 also describes a process for consolidating the grounds, wherein these grounds are treated by oily polymers containing siccative or drying catalysts which are hardened by air drying on the surface of the ground to be consolidated.

This treatment, which produces hard impermeable ground masses, is however unsuitable for consolidating subterranean formations whose permeability must be preserved.

U.S. Pat. No. 2,863,510 describes a process wherein oxidizable organic compounds are introduced into geological formations; however this process is adapted to the production of hydrocarbons by underground combustion.

German Pat. No. 2,343,021 and U.S. Pat. No. 3,941,191 describe a process for consolidating geological formations by means of solidifying agents, using combustion promoters as well as combustion activators, the oxidation being performed by injecting an oxygen-containing gas.

However this proccess suffers from the drawback of requiring combustion promoters and is really efficient only if the geological formation is preheated.

SUMMARY OF THE INVENTION

These drawbacks are obviated according to the invention by controlling the chemical alteration of a polymerizable material. This process comprises injecting into the formation a liquid mixture of organic products subjected in situ to a moderate chemical alteration by contacting this liquid mixture with a determined quantity of an oxidizing gas, so as to transform said liquid mixture by exothermic reaction into a substance which binds the unconsolidated elements of the formation, the injection of the oxidizing gas preventing any substantial reduction in the permeability of this formation relative to fluids such as oil or natural gas. The composition of the liquid mixture, as well as the oxygen content and the quantity of oxidizing gas are so adjusted as to make the reaction start at the normal temperature of the formation and to make it possible to control the extent of the oxidizing reaction of polymerization of the liquid mixture.

BRIEF DESCRIPTION OF THE DRAWING

The FIGURE schematically illustrates an embodiment of the present method.

DETAILED DISCUSSION

More particularly the invention provides a method for consolidating a geological formation, comprising the two following successive steps:
(a) injecting into the formation a liquid organic mixture containing at least one polymerizable chemical compound and a catalyst, this mixture being capable of chemically reacting in situ, with an oxidizing gas, at the normal temperature of the geological formation thereby producing a solid product which consolidates the formation without substantially reducing its permeability, and
(b) injecting a quantity of an oxidizing gas sufficient to achieve a substantially complete solidification of said organic liquid, but insufficient to increase the temperature reached in the formation, as the result of said reactions, above 350° C., and preferably adated to limit the temperature of the formation in the range from 100° C. to 300° C.

The process according to the invention is characterized by the combination of at least one polyethylenic hydrocarbon and of a catalyst comprising at least one element of the group formed by zirconium, cerium, lanthanum and lanthanides and at least one element of the group formed by vanadium, manganese, cobalt and zinc.

The process according to the invention is efficient even when the temperature of the formation (which in particular depends on its depth) is low, since, by oxidation of the organic material, a sufficient heat is produced in the treated zone, to reach the thermal level at which said organic mixture is efficiently polymerized and to obtain a proper cohesion between the grains of the geological formation. Moreover the oxygen content of the injected oxidizing gas and the amount of oxygen introduced into the formation are so controlled as to prevent the resulting temperature from exceeding the maximum temperature which would lead to a degradation of the polymerized material.

The organic mixture used in the process according to the invention may advantageously be constituted by polyethylenic hydrocarbons obtained by polymerization of dienes or trienes optionally diluted with an organic solvent, a catalyst as above defined being added thereto. The polyethylenic hydrocarbon will be advantageously polybutadiene. The solvents are, for example, hydrocarbons such as benzene, toluene, xylene, or a petroleum cut advantageously used in a proportion from 0 to 50% in order to limit the reactivity decrease resulting from dilution.

The catalyst components as used are salts such as carboxylates naphthenates, sulfonates, octoates, . . . soluble in the basic components of the organic mixture. The content of the solution in each of the metals of the catalyst will be smaller than 3 percent by weight and preferably from 0.007 to 2 percent by weight. The exact composition of the catalyst (selected metals and respective contents thereof) will depend on the nature of the surrounding medium and on the conditions prevailing in the deposit (pressure, temperature . . . ).

The amount of the injected organic mixture will be preferably smaller than 500 liters per meter of thickness of the geological formation; however larger amounts will not decrease the efficiency of the method according to the invention.

In the application of the method to oil reservoirs, the oxidizing gas will be preferably oxygen or air, optionally diluted with nitrogen, carbon dioxide or another gas which is chemically inert in the operating conditions. When applying the method to gas reservoirs, the oxidizing gaseous mixture will be preferably oxygen or air diluted with nitrogen, another inert gas or dry natural gas; however the natural gas content must be such that the gaseous mixture is not inflammable in the test conditions.

The oxygen content by volume of the gaseous mixture will be advantageously from 0.5 to 100%, preferably from 1 to 21%. The oxygen content for a given composition of the organic mixture will be lower as the injection pressure is higher. The presence of water in the gaseous mixture will be avoided by a suitable drying treatment, if necessary. Proportioning of the oxidizing mixture will be effected at the ground surface, the components of the mixture being supplied either by compressed gas bottles or, cryogenic gas or by compressors.

The oxygen volume content of the injected gas, measured under standard temperature and pressure conditions, will preferably be smaller than 200 liters per liter of injected organic mixture; excellent results are obtained by using from 10 to 80 liters of oxygen per liter of organic mixture.

In the accompanying FIG. 1, diagrammatically illustrating an embodiment of the process according to the invention, reference 1 designates a sandy geological formation traversed by a well 2, which comprises a casing 3 provided with apertures 4 at the level of the formation 1 from which a fluid, such as oil or natural gas, must be extracted.

In this embodiment the process according to the invention is carried out by successively injecting into the treated formation 1 predetermined amounts of an organic material 5, such as a polybutadiene to which a catalyst (as above-defined) has been added, optionally in admixture with another organic liquid, such as a solvent or a petroleum cut, and an oxidizing gas such as air or oxygen diluted as above indicated.

The organic liquid mixture and the gas may be injected one after the other through the same production tubing 7, which opens, at its lower end, substantially at the level of the apertures 4.

Parker means 9 provides for the sealing of the annular space between the casing 3 and the producton string 7, above the formation 1. In the production string 7 the oxidizing gas is separated from the organic mixture by a plug 8 of a slightly oxidizable or non-oxidizable material, this plug being formed, for example, of a small volume of solvent or of a petroleum cut in an oil well, or of natural gas in a gas well.

It is thus possible to prevent reactions of the organic mixture from taking place in the production tubing itself.

Obviously the above-described embodiment is by no way limitative and other embodiments may be contemplated.

Generally speaking, the liquid injected at 5 is an organic mixture which, in contact with an oxidizing gas at the temperature of the formation 1, can undergo a chemical alteration which leads to a consolidation of the formation in the vicinity of the well.

The liquid 5, which is more easily alterable by the oxidizing mixture than the hydrocarbons contained in the formation and than the basic organic compounds containing no catalyst, provides for the consolidation of the formation.

In the case of oil deposits, it will be advantageous, before injecting the liquid 5, to inject such fluids as xylene or a petroleum cut and an alcohol, such as isopropanol, in order to drive away the oil and the waer present in the vicinity of the well, since excessive amounts of oil and water may be detrimental to the efficiency of the consolidation of the medium.

The quantity of injected oxidizing gas will be so determined as to obtain a complete solidification of the organic liquid 5, while preventing, the temperature in the formation from increasing above 350° C., as a result of the evolved heat. According to the invention the combustion of the organic liquid 5 at high temperature is thus avoided therby preventing any degradation of the polymerization product and ensuring the protection of the well equipments, particularly of the casing 3.

The efficiency of the process according to the invention is illustrated by the following tests, the characteristics of the operating mode during these tests being by no way limitative.

TEST No. 1

An intimate mixture of 10 parts of an organic carrier consisting of quarry sand (80%) and kaolinite (20%) with 1 part of polybutadiene (viscosity=750 cP) was packed in a vertical thin walled tube 5 cm in diameter, over a height of 20 cm. The so-prepared solid mass had a porosity of 37% and its saturation in polyethylenic compound was 50% of the pore volume.

The test was conducted at a temperature of 50° C. under atmospheric pressure, with an air flow rate of 0.5 liter/minute. During the test, which lasted 7 hours, neither a decrease in the oxygen content of the effluent gas, nor a temperature increase could be observed. At the end of the test the solid mass was not consolidated.

TEST No. 2

An intimate mixture of an organic carrier with an organic liquid mixture was packed at ambient temperature in a thin walled tube 12.5 cm in diameter which formed the inner housing of a high pressure cylindrical cell. The inner tube was provided with heating collars and heat insulation means to compensate for the thermal losses during the temperature increase of the solid material.

The organic material was polybutadiene with the addition of 0.12% by weight of zirconium and 0.06% by weight of cobalt, both as naphthenates, and the inorganic carrier was quarry sand.

The test was performed under a relative pressure of 10 bars and with an air flow rate of 3 liters/minute (measured under standard temperature and pressure conditions). During the 4 hours test, the temperature rose to 102° C. At the end of the test it appeared that the medium was properly consolidated (compression strength: 86 bars) and that the permeability was preserved.

TEST No. 3

A test was performed with the use as organic mixture of polybutadiene containing 0.18% by weight of manganese octoate and 0.12% by weight of zirconium naphthenate and a quarry sand containing 5% kaolinite as inorganic carrier.

The test was carried out under a relative pressure of 10 bars with an air flow rate of 3 liters per minute (standard conditions), during 6 hours. A temperature increase from 20° C. to 158° C. was observed. After the test it was apparent that the permeability of the medium was preserved and that this medium was perfectly consolidated. Its compression strength was 104 bars.

TEST No. 4

An intimate mixture of quarry sand with polybutadiene containing 0.32% by weight of cerium and 0.42% by weight of cobalt, both as naphthenates, was used during this test which was performed under a pressure of 100 bars, the initial temperature being 50° C.

An oxygen-containing gas consisting of an air+nitrogen mixture containing 4% of oxygen was injected for 3.2 hours at a flow rate of 13.7 liters/minute (standard conditions). The reaction increased the temperature up to 300° C. At the end of the test the medium was perfectly consolidated. Its compression strength was higher than 200 bars.

TEST No. 5

This test was performed on a solid material formed by quarry sand containing 20% by weight of kaolinite and a polybutadiene containing 0.3% by weight of cerium and 0.42% by weight of cobalt both as naphthenates.

The operating pressure was 100 bars and the initial temperature 40° C.

A gas containing 2% of oxygen and 98% of nitrogen was injected for 5 hours 45 minutes at a rate of 10.3 liters/minute (standard conditions). The temperature rose to 124° C. The compression strength of the medium at the end of the test was higher than 150 bars.

TEST No. 6

Water was added to a sandy inorganic carrier containing 20% of kaolinite so as to obtain a mixture having a water content of 7% by weight. The mixture, placed into the cell described in relation with the test No. 2, was packed and then heated to 50° C.

A crude oil (specific gravity 0.87) was injected to saturate the free volume of the pores so as to constitute a medium representing an oil reservoir. After partial displacement of the fluids by successive plugs of gasoline, isopropyl alcohol and gasoline, an organic mixture formed of polybutadiene with the addition of 0.3% by weight of cerium and 0.4% by weight of cobalt, both as naphthenates, was injected.

The relative pressure in the cell was then increased to 100 bars and a gas containing 8% oxygen and 92% nitrogen was injected during 5 hours at a rate of 4 liters/minute (standard conditions). The reaction resulted in a temperature rise to 216° C. The so-obtained medium had preserved its permeability and was properly consolidated; its compression strength was 62 bars.

What is claimed is:

1. A process for consolidating a geological formation, which comprises the steps of:
   (a) injecting into the formation a liquid organic mixture comprising a polymerizable polyethylenic hydrocarbon, and a catalyst comprising a first component which is at least one zirconium, cerium, lanthanum or lanthanide salt and a second component which is at least one vanadium, manganese, cobalt or zinc salt, said mixture being capable of reacting in situ with an oxidizing gas, at the normal temperature of the formation, to produce a solid compound which consolidates the formation; and
   (b) an amount of an oxidizing gas sufficient to produce substantially complete solidification of the polymerizable polyethylenic hydrocarbon and thereby consolidate the formation, without increasing the temperature in the formation above a preselected value and without substantial reduction in its permeability.

2. A process according to claim 1, wherein the components of the catalyst are salts soluble in the liquid organic mixture.

3. A process according to claim 1, wherein said polyethylenic hydrocarbon is liquid polybutadiene.

4. A process according to claim 1, wherein said liquid organic mixture further comprises up to 50% of a hydrocarbon solvent, said solvent being benzene, toluene, xylene or a petroleum cut.

5. A process according to claim 1, wherein the amount of each catalyst component, as metal, is 0.007–2 percent by weight, relative to the liquid organic mixture.

6. A process according to claim 1, wherein the oxidizing gas is air.

7. A process according to claim 1, wherein said preselected temperature is 350° C.

8. A process according to claim 1, wherein the amount of the oxidizing gas injected provides 10–80 liters of oxygen per liter of organic mixture.

9. A process according to claim 1, which further comprises the step of injecting xylene or a petroleum cut, and an alcohol into said formation prior to injecting said liquid organic mixture; whereby excessive amounts of oil and water are removed from the area of the formation to be consolidated.

* * * * *